(12) United States Patent
Beauchamp

(10) Patent No.: US 7,226,047 B1
(45) Date of Patent: Jun. 5, 2007

(54) WELDER'S PIPE CLAMP

(76) Inventor: Abel Beauchamp, 425 Pat Dr., Avondale, LA (US) 70094

( * ) Notice: Subject to any disclaimer, the term of this patent is extended or adjusted under 35 U.S.C. 154(b) by 0 days.

(21) Appl. No.: 11/245,785

(22) Filed: Sep. 2, 2005

Related U.S. Application Data

(60) Provisional application No. 60/606,748, filed on Sep. 2, 2004.

(51) Int. Cl.
*B23Q 3/18* (2006.01)

(52) U.S. Cl. .......................................... 269/43; 29/272
(58) Field of Classification Search ................ 269/268, 269/6, 279, 43, 228, 280; 81/422, 424; 29/272
See application file for complete search history.

(56) References Cited

U.S. PATENT DOCUMENTS

| | | | |
|---|---|---|---|
| 1,531,377 A | * | 3/1925 | Clarke .......................... 269/279 |
| 4,306,345 A | | 12/1981 | Dearman |
| 4,344,215 A | | 8/1982 | Dearman |
| 4,483,059 A | * | 11/1984 | Dearman ....................... 269/43 |
| 4,601,221 A | | 7/1986 | Kalkbrenner et al. |
| 4,673,174 A | | 6/1987 | Tabbert |
| 6,389,937 B1 | | 5/2002 | Kang |

* cited by examiner

*Primary Examiner*—Robert C. Watson
(74) *Attorney, Agent, or Firm*—Kenneth L Tolar

(57) ABSTRACT

A welder's pipe clamp includes a pair of reciprocal handle members each having a pivotal jaw attached thereto. Each jaw includes a pipe clamping member pivotally attached to a distal end thereof. Each pipe clamping member includes upper and lower arcuate, pipe-engaging surfaces that maintain a pair of pipe sections in alignment for a welder.

3 Claims, 2 Drawing Sheets

FIG.3
FIG.4
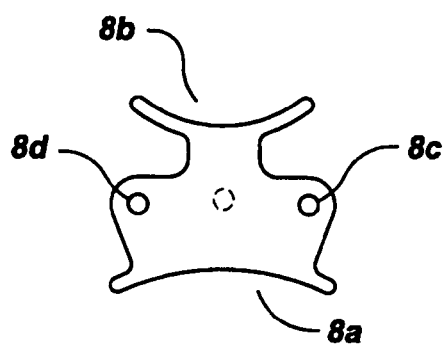
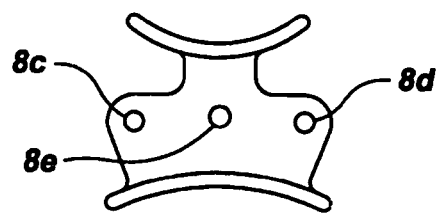
FIG.5
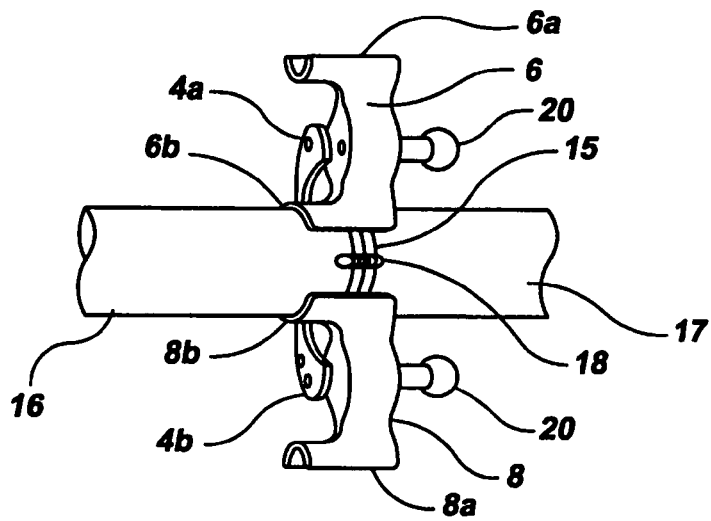
FIG.6
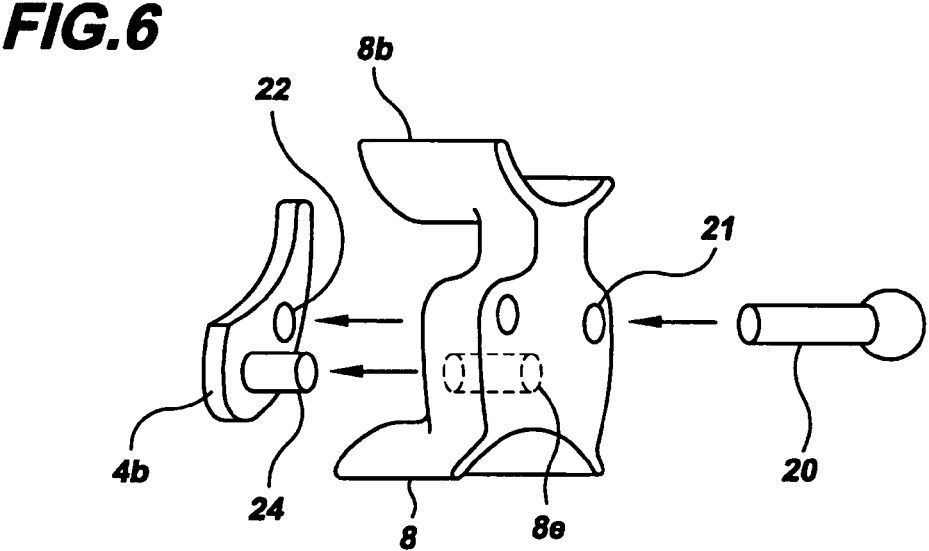

WELDER'S PIPE CLAMP

CROSS REFERENCE TO RELATED APPLICATIONS

This application is entitled to the benefit of provisional application No. 60/606,748 filed on Sep. 2, 2004.

BACKGROUND OF THE INVENTION

The present invention relates to a tool for holding two pipe sections in proper alignment for a welder.

DESCRIPTION OF THE PRIOR ART

Welding two pipe sections has always been problematic and burdensome. Typically, an assistant holds the two pipe sections in alignment while a worker "tack" welds the sections to temporarily secure the joint. Such practice consumes valuable manpower and is time consuming and inconvenient. Accordingly, there is currently a need for a tool that allows an unassisted welder to quickly and conveniently align a pair of pipe sections prior to welding.

A variety of tools for assisting pipe fitters exist in the prior art. For example, U.S. Pat. No. 4,344,215 issued to Dearman discloses a pipe fitter's tool for joining a length of pipe to a fitting including a pair of V-shaped jaws that clamp onto a pipe.

U.S. Pat. No. 4,601,221 issued to Kalkbrenner, et al. discloses a clamping device for rectangular work pieces including a pair of right angled jaw portions that form rectangular openings to hold a rectangular work piece.

U.S. Pat. No. 4,603,174 issued to Tabbert discloses an angled clamping tool that is designed to retain work pieces at a selected angular relationship.

U.S. Pat. No. 6,389,937 issued to Kang discloses universal pliers for removing and installing varying diameter pipes.

U.S. Pat. No. 4,306,345 issued to Dearman discloses a pipe fitter's tool for adjoining a length of pipe to a fitting.

As indicated above, various pipe fitter's tools exist in the prior art. However, each of the above described devices is designed to assist a worker with fastening a pipe section to a pipe fitting. As such, none of the prior art devices are specifically designed to hold two pipe sections in fixed, coaxial alignment while a worker welds the two sections together. The present invention provides a uniquely designed clamp that includes a pair of arcuate, pipe clamping surfaces that simultaneously encompass a pair of pipe sections while a worker tack welds the joint formed therebetween.

SUMMARY OF THE INVENTION

The present invention relates to a welder's pipe clamp including a pair of reciprocal handle members each having a pivotal jaw attached thereto. Each jaw includes a pipe clamping member pivotally attached to a distal end thereof. Each pipe clamping member includes upper and lower arcuate, pipe-engaging surfaces that maintain a pair of pipe sections in alignment for a welder.

It is therefore an object of the present invention to provide a tool that allows a worker to maintain a pair of pipe sections in proper alignment prior to welding.

It is another object of the present invention to provide a tool that allows a worker to weld a pair of pipe sections without assistance from another worker.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 is a front view of a clamping member.

FIG. 4 is a rear view of a clamping member.

FIG. 5 is a perspective view of the tool according to the present invention secured about a pair of aligned pipe sections.

FIG. 6 depicts the means of attaching each clamping member to a corresponding jaw.

DESCRIPTION OF THE PREFERRED EMBODIMENT

Figure 1:
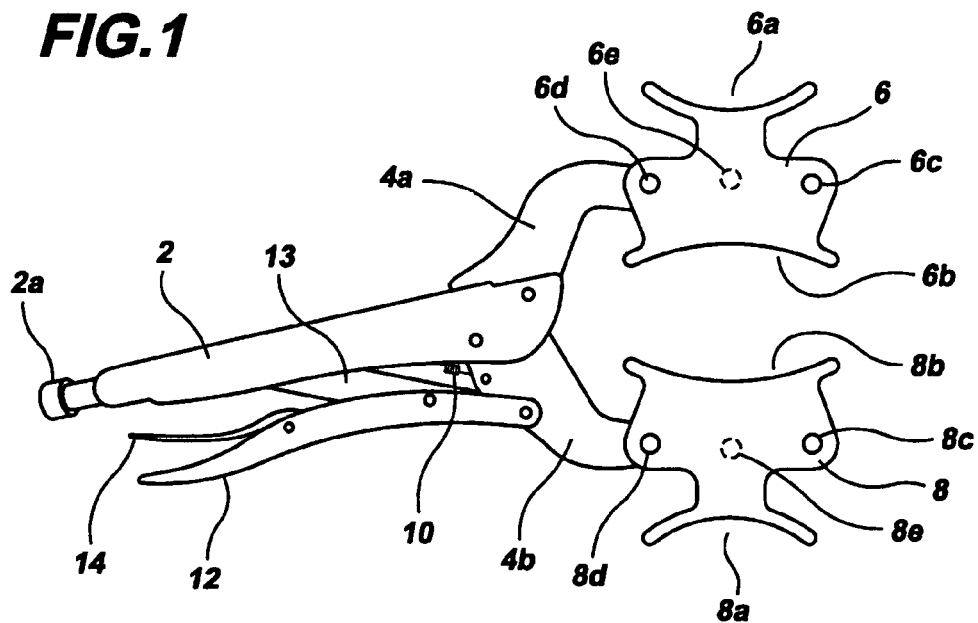
FIG. 1 is a side view of the pipe clamping tool according to the present invention.
Figure 2:
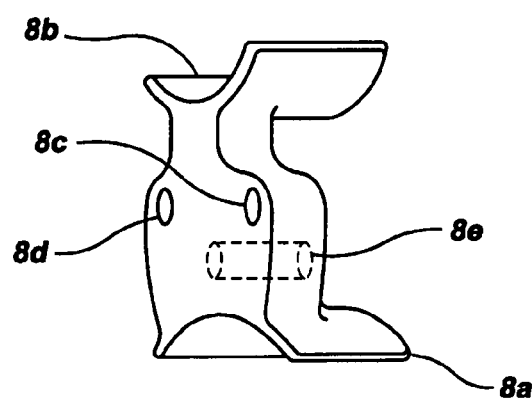
FIG. 2 is an isometric view of a clamping member.

The present invention relates to a welder's pipe clamp. The device comprises an upper jaw 4a and a lower jaw 4b each terminating at a distal end. Both the upper jaw and the lower jaw are pivotally secured to a distal end of an upper handle member 2. The lower jaw is likewise pivotally attached to an end of a lower handle member 12. The upper and lower handle members are pivotally interconnected by a brace member 13 that allows the handle members to be reciprocated to move the jaws toward and away from each other. The lower handle member includes a compression screw 2a that threadedly rides therein for adjusting the tension on the upper jaw. A spring 10 opens the upper jaw when a release lever 14 is depressed and also maintains pressure on an internal locking mechanism to maintain the upper and lower jaws in a locked relationship about an object. The above described handle locking mechanism is conventional and is similar to that found in traditional locking pliers.

Pivotally attached to the distal end of each jaw is a reversible pipe clamp member 6,8. Each pipe clamp member includes an upper 6a,8b and a lower 6b,8a arcuate pipe engaging surface for partially encompassing a portion of a pipe circumference. The upper clamp pipe engaging surface has a different curvature than that of the lower clamping surface so that the two clamp members can be removed and inverted to fit about a pipe having a different sized diameter.

Preferably, each clamp member is secured to its respective jaw with a detent type locking pin 20 that seats within a bore 21 on the clamping member and a coaxial passageway 22 on the corresponding jaw. The diameters of the bore and passageway are slightly larger than that of the pin to allow each clamping member to move slightly relative to the jaws when being clamped about a pipe exterior. Each jaw further includes a nipple 24 that seats within a channel 6e, 8e formed on each clamping member.

To use the above described clamp, a worker assures that the appropriately sized pipe engaging surfaces are facing each other depending upon the size of the pipes to be welded. The worker first attempts to clamp the tool about a first pipe section 16 to assure that the jaws are properly spaced to allow tight fastening about the pipe sections. The compression screw is adjusted if necessary to achieve the desired jaw spacing. An end of the first pipe section is placed between the two clamping members and the handles are compressed sufficiently to hold the pipe section in place. The other pipe section 17 is likewise placed between the clamping members and the two pipes are aligned as desired. Once the pipe sections are properly aligned, the handles are locked allowing the worker to tack weld the resulting joint 18 between the two pipe sections. By actuating the release lever, the worker can remove the clamp and finish welding the joint.

The above described device is not limited to the exact details of construction and enumeration of parts provided herein. Furthermore, the size, shape, materials of construction as well as the size and number of clamping members can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A welder's pipe clamp comprising:
    an upper handle member having an upper jaw and a lower jaw pivotally secured thereto, each of said jaws terminating at a distal end;
    a lower handle member having said lower jaw pivotally secured thereto;
    a reversible pipe clamp member pivotally attached to the distal end of each jaw, each of said clamp members including an upper and a lower arcuate pipe engaging surface for partially encompassing a portion of a pipe circumference wherein each clamp member is secured to a corresponding jaw with a detent type locking pin that seats within a bore on the clamping member and a coaxial passageway on a corresponding jaw, wherein the diameters of the bore and passageway are slightly larger than that of the pin to allow each clamping member to move slightly relative to the jaws when being clamped about a pipe exterior and wherein each jaw further includes a nipple that seats within a channel formed on each clamping member;
    means for locking said clamping members about the circumference of a pair of pipe sections to assist a worker in welding said sections.

2. The pipe clamp according to claim 1 wherein said upper pipe engaging surface has a different curvature than that of the lower pipe engaging surface so that the two clamp members can be removed and inverted to fit about a pipe having a different sized diameter.

3. The pipe clamp according to claim 1 wherein said means for locking said clamping members about the circumference of a pair of pipe sections to assist a worker in welding said sections comprises:
    a brace member interconnecting said upper and lower handle members that allows the handle members to be reciprocated to move the jaws toward and away from each other;
    a compression screw riding on the lower handle member for adjusting the tension on the upper jaw;
    a spring for opening the upper jaw when a release lever is depressed and which also maintains pressure on an internal locking mechanism to maintain the upper and lower jaws in a locked relationship about an object.

* * * * *